(12) United States Patent
Kawauchi

(10) Patent No.: US 8,190,600 B2
(45) Date of Patent: May 29, 2012

(54) SEARCH DEVICE AND SEARCH PROGRAM

(75) Inventor: Hiroshi Kawauchi, Kariya (JP)

(73) Assignee: Aisin AW Co., Ltd., Anjo (JP)

( * ) Notice: Subject to any disclaimer, the term of this patent is extended or adjusted under 35 U.S.C. 154(b) by 394 days.

(21) Appl. No.: 12/382,226

(22) Filed: Mar. 11, 2009

(65) Prior Publication Data

US 2009/0271376 A1    Oct. 29, 2009

(30) Foreign Application Priority Data

Apr. 24, 2008    (JP) ................. 2008-113765

(51) Int. Cl.
*G06F 17/30* (2006.01)
*G06F 7/00* (2006.01)

(52) U.S. Cl. ........ 707/722; 707/758; 715/828; 715/864; 701/487

(58) Field of Classification Search .................... None
See application file for complete search history.

(56) References Cited

U.S. PATENT DOCUMENTS

| | | | |
|---|---|---|---|
| 5,982,369 A * | 11/1999 | Sciammarella et al. | 715/835 |
| 6,785,671 B1 * | 8/2004 | Bailey et al. | 705/26.81 |
| 6,873,982 B1 * | 3/2005 | Bates et al. | 707/737 |
| 6,910,037 B2 * | 6/2005 | Gutta et al. | 707/730 |
| 2005/0080770 A1 * | 4/2005 | Lueder et al. | 707/3 |
| 2006/0242164 A1 * | 10/2006 | Evans et al. | 707/100 |
| 2007/0250488 A1 * | 10/2007 | Lee | 707/3 |

FOREIGN PATENT DOCUMENTS

JP    A-11-271084    10/1999

* cited by examiner

*Primary Examiner* — Alicia Lewis
(74) *Attorney, Agent, or Firm* — Oliff & Berridge, PLC

(57) ABSTRACT

Where destination candidates that are selected by a search are arranged in a specified display order, the candidates are divided into two subgroups, based on a median value, and a first destination candidate, a median destination candidate, and a last destination candidate are displayed. Where a desired candidate is included among the three displayed candidates, a user chooses the desired candidate. Where the desired candidate is not displayed, the user selects one of a first subgroup button and a second subgroup button to display the destination candidates in the subgroups before and after the median value, respectively. If two-hundred-fifty-three candidates are displayed in a sequential list in five candidate display spaces, a maximum of fifty operations are required to view all of the candidates. In contrast, the divided display arranges the two-hundred-fifty-three candidates into six levels, so the desired candidate can be selected in a maximum of six operations.

6 Claims, 11 Drawing Sheets

```
(1) TOSUNII                        — 81

(2) – (12)                         — 82

(13) TOSUNII SUTOA OKAYAMA         — 83

(14) – (24)                        — 84

(25) TOSUNII RIZOOTO IN            — 85
```

FIG. 2

DESTINATION DATA

| SEARCH KEY | NAME | COORDINATES | TELEPHONE NUMBER | ADDITIONAL INFORMATION | ... | KEYWORDS (FOR NAME) | | | | KEYWORD (FOR ADDRESS) | KEYWORD (FOR GENRE) |
|---|---|---|---|---|---|---|---|---|---|---|---|
| TSU-KU-BA DA-I-GA-KU | TSUKUBA DAIGAKU | xxxx1 | 023-xxx-yyyy | | | TSU-KU-BA | DA-I-GA-KU | | | | |
| TSU-KU-BA GA-KU-E-N | TSUKUBA GAKUEN | xxxx2 | yyyy-xxx-zzzz | | | TSU-KU-BA | GA-KU-E-N | | | | |
| TSU-KU-BA JI-YO-U-HO-U SE-N-TA— | TSUKUBA JOUHOU SENTAA | xxxx3 | zzzz-yyyy-ssss | | | TSU-KU-BA | JI-YO-U-HO-U | SE-N-TA— | ... | | |
| TSU-RU-O-KA | | | | | | | | | | | |
| ... | | | | | | | | | | | |

FIG. 4A

1 : TOSUNII
2 : TOSUNII ANBASADAA
3 : TOSUNII EIGO KYOUSHITSU
4 : TOSUNII ON AISU
5 : TOSUNII SHII
6 : TOSUNII SHII EKI
7 : TOSUNII HEIMEN CHUUSHAJOU
8 : TOSUNII HOTERU MIRAKO
9 : TOSUNII RITTAI CHUUSHAJOU
10 : TOSUNII SUTOA AKUA
11 : TOSUNII SUTOA IKEBUKURO
12 : TOSUNII SUTOA UMEDA
13 : TOSUNII SUTOA OKAYAMA
14 : TOSUNII SUTOA KORIYAMA
15 : TOSUNII SUTOA SHINSAIBASHI
16 : TOSUNII SUTOA CHIRYU
17 : TOSUNII SUTOA NAGOYA
18 : TOSUNII SUTOA HIROSHIMA
19 : TOSUNII SUTOA FUKUOKA
20 : TOSUNII SUTOA MACHIDA
21 : TOSUNII SUTOA YOKOHAMA
22 : TOSUNII RANDO
23 : TOSUNII RANDO EKI
24 : TOSUNII RANDO HOTERU
25 : TOSUNII RIZOOTO IN

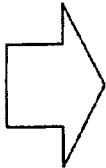

FIG. 4B

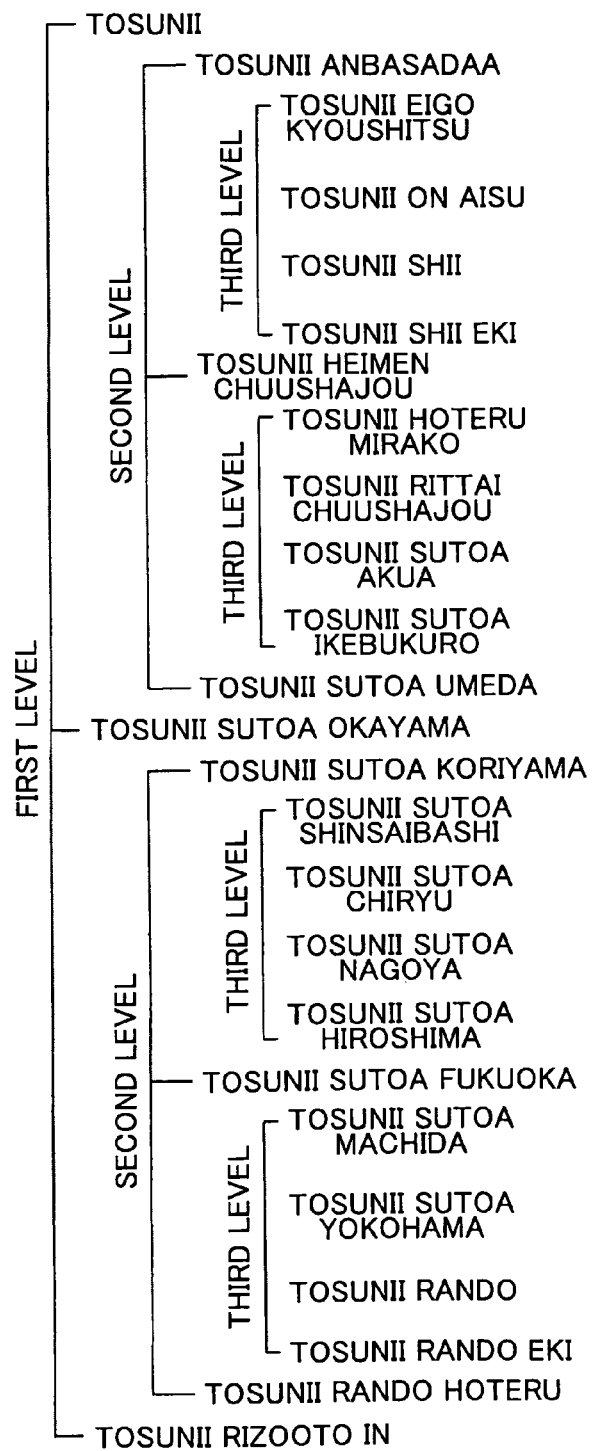

FIG. 8A

- TOSUNII
- TOSUNII ANBASADAA
- TOSUNII EIGO KYOUSHITSU
  - TOSUNII ON AISU
  - TOSUNII SHII
  - TOSUNII SHII EKI
    - TOSUNII HEIMEN CHUUSHAJOU
    - TOSUNII HOTERU MIRAKO
  - TOSUNII RITTAI CHUUSHAJOU
    - TOSUNII SUTOA AKUA
    - TOSUNII SUTOA IKEBUKURO
    - TOSUNII SUTOA UMEDA
  - TOSUNII SUTOA OKAYAMA
- TOSUNII SUTOA KORIYAMA
  - TOSUNII SUTOA SHINSAIBASHI
  - TOSUNII SUTOA CHIRYU
  - TOSUNII SUTOA NAGOYA
    - TOSUNII SUTOA HIROSHIMA
    - TOSUNII SUTOA FUKUOKA
  - TOSUNII SUTOA MACHIDA
    - TOSUNII SUTOA YOKOHAMA
    - TOSUNII RANDO
    - TOSUNII RANDO EKI
  - TOSUNII RANDO HOTERU
- TOSUNII RIZOOTO IN

FIG. 8B

- TOSUNII
- TOSUNII ANBASADAA
  - TOSUNII EIGO KYOUSHITSU
  - TOSUNII ON AISU
    - TOSUNII SHII
    - TOSUNII SHII EKI
    - TOSUNII HEIMEN CHUUSHAJOU
  - TOSUNII HOTERU MIRAKO
    - TOSUNII RITTAI CHUUSHAJOU
    - TOSUNII SUTOA AKUA
  - TOSUNII SUTOA IKEBUKURO
  - TOSUNII SUTOA UMEDA
- TOSUNII SUTOA OKAYAMA
  - TOSUNII SUTOA KORIYAMA
    - TOSUNII SUTOA SHINSAIBASHI
      - TOSUNII SUTOA CHIRYU
      - TOSUNII SUTOA NAGOYA
      - TOSUNII SUTOA HIROSHIMA
    - TOSUNII SUTOA FUKUOKA
      - TOSUNII SUTOA MACHIDA
      - TOSUNII SUTOA YOKOHAMA
  - TOSUNII RANDO
  - TOSUNII RANDO EKI
- TOSUNII RANDO HOTERU
- TOSUNII RIZOOTO IN

SEARCH DEVICE AND SEARCH PROGRAM

INCORPORATION BY REFERENCE

The disclosure of Japanese Patent Application No. 2008-113765 filed on Apr. 24, 2008, including the specification, drawings and abstract is incorporated herein by reference in its entirety.

BACKGROUND OF THE INVENTION

The present invention relates to a search device and a search program, such as a search device and a search program that input a character string and search for a corresponding candidate.

DESCRIPTION OF THE RELATED ART

A search device that inputs a character string such as a phonetic representation or the like and searches for a candidate that includes a character string that corresponds to the input character string is used in a wide variety of fields, such as mobile telephones, navigation devices, and the like.

To take the case of a navigation device, for example, as proposed in Japanese Patent Application Publication No. JP-A-H11-271084, in a case where a search is performed for a name of a location, a name of a facility, or the like at a destination, the destination candidates are selected by inputting a phonetic representation of a name, an address, a telephone number, or the like from a touch panel.

Then, when the search according to the phonetic representation, genre, or the like is completed, the selected destination candidates are displayed in list form on a display screen, and if the desired facility is included in the displayed list, it is chosen from among the locations in the list. If the desired facility is not included in the displayed list, the desired facility is sought and chosen by scrolling the list one of one candidate and one page at a time.

SUMMARY OF THE INVENTION

With this sort of search device that is used in the navigation device, a specified number of the selected destination candidates, such as five, for example, are displayed at one time, in order according to the Japanese syllabary and starting from the beginning.

Therefore, if the desired facility is the last of the selected destination candidates in the display order, the scrolling and page switching operations must be performed any number of times. The number of operation cycles becomes particularly great in a case where the number of selected destination candidates is large.

In a case where the desired location is in the back of the displayed list, the scrolling and page switching can be performed in a reverse direction, starting from the beginning of the display.

However, because it is not possible to know where the desired facility is positioned among all the selected destination candidates, it is not clear that the scrolling and page switching in the reverse direction will actually reach the desired facility more quickly.

Accordingly, it is an object of the present invention to make it possible to choose the desired candidate more efficiently from among the selected candidates that correspond to the input character string.

According to an aspect of the present invention, the search device is configured such that it specifies as the lower level candidate groups, the plurality of the sub-candidate groups of which the candidates are consecutive in each group but not consecutive between different group, all the candidates or the selected lower level candidate groups. The search device also displays the candidates that are not in one of the specified lower level candidate groups and selects the specified lower level candidate groups or the displayed candidates. The search device then sets the selected lower level candidate group or all of the candidates to be displayed. The search device thus can display and select a desired destination effectively.

BRIEF DESCRIPTION OF THE DRAWINGS

FIG. 2 is an explanatory figure that conceptually shows contents of destination data (location information) that is stored in a destination data file;

FIG. 4A and FIG. 4B show examples of found destination candidates that correspond to an input character string;

FIG. 8A and FIG. 8B are figures that show hierarchical arrangements in a case where a number of destination candidate spaces is seven;

DETAILED DESCRIPTION OF THE EMBODIMENTS

A search device and a search program according to the present invention, as well as a preferred embodiment in a navigation device and a navigation program, will be explained in detail below with reference to FIGS. 1 to 11F.

(1) Overview of the Embodiment

In the present embodiment, in a case where facilities information (destination candidates) that has been selected by a search is arranged in a specified display order, the facilities information is divided into two subgroups, based on a median value (destination candidate) in the specified display order, and a first destination candidate, the median destination candidate, and a last destination candidate are displayed.

In a case where a desired destination candidate is included among the three displayed destination candidates (the first, the median, and the last), a user chooses the desired destination candidate.

On the other hand, in a case where the desired destination candidate is not included among the three displayed destination candidates, the user selects one of a first subgroup button and a second subgroup button to narrow down the destination candidates, according to whether the desired destination candidate is positioned in the subgroup before the median value or the subgroup after the median value.

For example, if five candidate display spaces are provided and two-hundred-fifty-three destination candidates are displayed in the form of a sequential list, a maximum of fifty operations are required in order to view all of the destination candidates. In contrast to this, the divided display of the present embodiment arranges the two-hundred-fifty-three destination candidates hierarchically into six levels, making it possible to choose the desired candidate with a maximum of six operations, thereby significantly reducing the number of operations.

In the displaying of the facilities list, the first value, the last value, and the median value among all of the applicable facilities are displayed.

(a) In a case where the facility that the user wants is one of the first value, the last value, and the median value, the user can set the destination by pressing (touching) the applicable facility button.

(b) In a case where the desired facility is not one of the first value, the last value, and the median value, the user chooses one of a range that precedes the median value and a range that follows the median value, and the data in the chosen range is displayed as in (a) above.

(c) However, in a case where the number of the displayed destination candidates is not greater than the number of the candidates that can be displayed in one list, ordinary list displaying is performed.

(d) In a case where undisplayed destination candidates still remain, even if buttons are displayed for the first value, the last value, the median value, and values in between, the destination candidates that follow the first value may also be displayed sequentially.

(2) Details of the Embodiment

Figure 1:
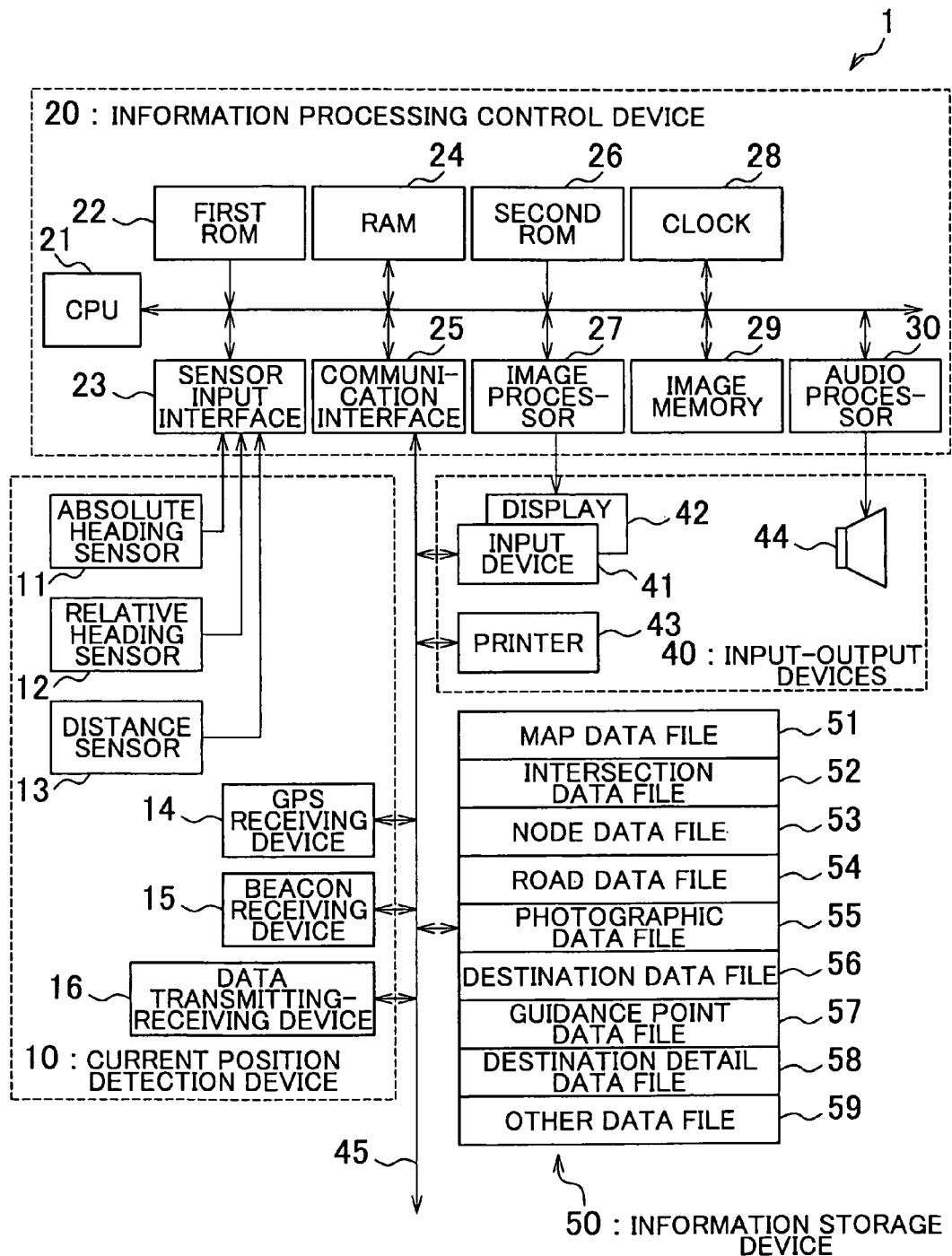
FIG. 1 is a system configuration diagram of a navigation device in which an embodiment is used.

FIG. 1 is a system configuration diagram of a navigation device 1 in which the search device according to the present embodiment is used.

The navigation device 1 is installed in a vehicle and, as shown in FIG. 1, includes a current position detection device 10, an information processing control device 20, input-output devices 40, and an information storage device 50.

A configuration of the current position detection device 10 will be explained first. An absolute heading sensor 11 is a geomagnetic sensor that detects the direction in which the vehicle is facing, by using a magnet to detect the direction north, for example. The absolute heading sensor 11 may be any unit that detects an absolute heading.

A relative heading sensor 12 is a sensor that detects, for example, whether or not the vehicle has turned at an intersection. It may be an optical rotation sensor that is attached to a rotating portion of the steering wheel, a rotating type of resistance volume, or an angle sensor that is attached to a wheel portion of the vehicle.

A gyroscopic sensor that utilizes angular velocity to detect a change in an angle may also be used. In other words, the relative heading sensor 12 may be any unit that can detect an angle that changes in relation to a reference angle (the absolute heading).

A distance sensor 13 may be, for example, a unit that detects and measures a rotation of a wheel or a unit that detects an acceleration and derives its second integral. In other words, the distance sensor 13 may be any unit that can measure a distance that the vehicle moves.

A Global Positioning System (GPS) receiving device 14 is a device that receives a signal from a man-made satellite. It can acquire various types of information, such as a signal transmission time, information on the position of the receiving device 14, a movement velocity of the receiving device 14, a direction of movement of the receiving device 14, and the like.

A beacon receiving device 15 is a device that receives a signal that is transmitted from a transmission device that is installed at a specific location. Specifically, the beacon receiving device 15 can obtain information that pertains to the vehicle's operation, such as VICS information, information on traffic congestion, information on the vehicle's current position, parking information, and the like.

A data transmitting-receiving device 16 is a device that utilizes a telephone circuit or radio waves to perform communication and exchange information with other devices outside the vehicle.

For example, a car telephone may be used in a variety of ways, such as for ATIS, VICS, GPS route correction, inter-vehicle communication, and the like, and is capable of inputting and outputting information that relates to the operation of the vehicle.

The information processing control device 20 performs calculations and control based on information that is input from the current position detection device 10 and the input-output devices 40, as well as on information that is stored in the information storage device 50. The information processing control device 20 is also a unit that performs control such that calculation results are output to an output unit such as a display 42, a printer 43, a speaker 44, or the like.

The configuration of the information processing control device 20 is described below.

A central processing unit (CPU) 21 performs overall calculations and control for the entire navigation device 1.

A first ROM 22 stores programs that are related to navigation, specifically navigation programs that are related to current position detection, to route searching, to displayed guidance, and the like.

A sensor input interface 23 is a unit that receives an input from the current position detection device 10.

A RAM 24 stores information that the user inputs, such as destination information, information on a point that the vehicle passes, and the like that are input from an input device 41 that is described later. The RAM 24 is also a storage unit for storing the results of calculations that the CPU 21 makes based on the information that is input by the user, route search results, and map information that is read in from the information storage device 50.

A communication interface 25 is a unit that inputs and outputs information from the current position detection device 10, particularly information that is acquired from outside the vehicle.

A second ROM 26 stores programs that are related to navigation, specifically a navigation program that is related to voice guidance.

An image processor 27 is a processing unit that takes vector information that is processed by the CPU 21 and processes it into image information.

A clock 28 keeps time.

An image memory 29 is a unit that stores the image information that the image processor 27 processes.

An audio processor 30 processes audio information that is read in from the information storage device 50 and outputs it to the speaker 44.

The input-output devices 40 include the input device 41, the display 42, the printer 43, and the speaker 44. The user uses the input device 41 to input data such as a destination, a point that the vehicle passes, a search condition, and the like. The display 42 displays an image. The printer 43 prints information. The speaker 44 outputs the audio information. The input device 41 may be a touch panel that is provided on the face of the display 42, a touch switch, a joystick, a key switch, or the like.

A map of the area around the current position, various types of operation screens, and a driving route to the destination are displayed on the display 42.

The information storage device 50 is connected to the information processing control device 20 through a transmission route 45.

The information storage device 50 stores a map data file 51, an intersection data file 52, a node data file 53, a road data file 54, a photographic data file 55, a destination data file 56, a guidance point data file 57, a destination detail data file 58, and an other data file 59.

The information storage device 50 is generally configured from an optical storage medium such as a DVD-ROM or a CD-ROM, or from a magnetic storage medium such as a hard disk or the like, but it may also be configured from any one of various types of storage media, such as a magneto optical disk, a semiconductor memory, or the like.

The map data file 51 stores map data such as a national road map, road maps of various regions, residential maps, and the like. The road maps include various types of roads, such as main arterial roads, expressways, secondary roads, and the like, as well as terrestrial landmarks (facilities and the like). The residential maps include graphics that show the shapes of terrestrial structures and the like, as well as street maps that indicate street names and the like. The secondary roads are comparatively narrow roads with rights of way that are narrower than the prescribed values for national routes and prefectural routes. They include roads for which traffic restriction information is not added, such as "one-way" and the like.

The intersection data file 52 stores data that is related to intersections, such as geographical coordinates for the locations of intersections, intersection names, and the like. The node data file 53 stores geographical coordinate data and the like for each node that is used for route searching on the map. The road data file 54 stores data that is related to roads, such as the locations of roads, the types of roads, the number of lanes, the connection relationships between individual roads, and the like.

The photographic data file 55 stores image data of photographs taken of locations that require visual display, such as various types of facilities, tourist areas, major intersections, and the like. The guidance point data file 57 stores guidance data on geographical points where guidance is required, such as the content of a guidance display sign that is installed on a road, guidance for a branching point, and the like. The destination detail data file 58 stores detailed data that pertains to the destinations that are stored in the destination data file 56.

The destination data file 56 stores the data that is used in the destination searches, such as data on major tourist areas, buildings, facilities, locations such as companies, sales offices, and the like that are listed in telephone directories and that can be selected as destinations, and the like.

FIG. 2 is a figure that conceptually shows contents of the destination data (location information) that is stored in the destination data file 56.

As shown in FIG. 2, a search key, a name, coordinates, a telephone number, additional information, and the like are stored as the destination data, along with keywords that are used in the present embodiment.

The search key is the phonetic representation of the name of the destination. The search key is expressed in the input units of the input device 41 (in the present embodiment, the fifty sounds of the Japanese syllabary on a touch panel).

The coordinates are expressed as x and y coordinate information that indicates the latitude and the longitude of the destination. The additional information is detailed data that pertains to the destination.

The keywords are stored such that it is possible to differentiate the keywords for different searchable items (the name, an address, a genre). For example, the keywords "tsu-ku-ba" and "da-i-ga-ku" are stored for the destination "Tsukuba Daigaku". In the case of the destination "Kakudonarudo Tokyo Ekimae Store", the stored keywords are "ka-ku-do-na-ru-do", "to-u-kyo-u e-ki", and the like.

The keywords for the address and the genre are stored in the same manner, with the keywords corresponding to the destinations. The genres are hierarchically arranged classifications for the destinations, such as "eat, drink", "buy, borrow", "stay", "see, play", "vehicle-related facility", and the like. On the level below "buy, borrow", for example, the genres are "convenience store", "supermarket", "discount store", "department store", and the like. The genres to which each destination belongs are set in advance and stored.

The keyword may be, for example, a word that occurs at least a specified number of times in the name, the address, or the like of the destination, but the keywords may also be created using contractions and abbreviations, such as "ko-n-bi-ni" for "konbiniensu sutoa", "ge-e-se-n" for "geemu sentaa", and the like.

In the present embodiment, as described later, expressions (representations) of the keywords that correspond to a character input and are selected based on their phonetic representations are displayed as an input key.

In some cases, a contraction, a nickname, or the like is stored as a keyword in the destination data, even if the word is not a part of the phonetic representation of the destination. For example, for "geemu sentaa kogami honsha", in addition to the keywords "ge-e-mu se-n-ta-a", "ko-ga-mi", and "ho-n-sha", the contraction "ge-e-se-n" may also be stored as a keyword in some cases.

In the navigation device 1 that is configured in this manner, route guidance is performed as described below.

The current position detection device 10 detects the current position, and the navigation device 1 reads the map information for the area surrounding the current position from the map data file 51 in the information storage device 50, then displays the map information on the display 42.

Then, when the destination is set by destination setting processing that includes divided display processing of the candidates according to the present embodiment, the information processing control device 20 searches for (computes) a plurality of candidates for a route from the current position to the destination and displays the candidates on the map that is displayed on the display 42. When the driver selects one of the routes, the information processing control device 20 acquires the selected route by storing it in RAM 24 (route acquisition unit).

Note that the information processing control device 20 may also acquire the route by transmitting the current position of the vehicle (or a departure point that is input) and the destination to an information processing center and receiving a route to the destination that has been found by the information processing center. In this case, the communication of the destination and the route is accomplished by wireless communication through the communication interface 25.

When the vehicle is in motion, the route guidance is performed by tracking the current position that is detected by the current position detection device 10.

The route guidance specifies the vehicle's current position on the map by using map matching between the road data that corresponds to the chosen route and the current position that is detected by the current position detection device 10, then displays the chosen route and the current position on the map of the area surrounding the current position of the vehicle, which is displayed on the display 42.

Based on the relationship between the chosen route and the current position, the information processing control device 20 determines whether or not guidance is necessary. Specifically, in a case where the vehicle will continue to drive straight ahead for at least a specified distance, the information processing control device 20 determines whether or not route guidance and direction guidance are necessary for a specified road change point or the like. If guidance is necessary, the guidance is displayed on the display 42 and also provided by voice.

Next, the destination setting processing that is included in the divided display processing of the candidates according to the present embodiment will be explained.

Figure 3:
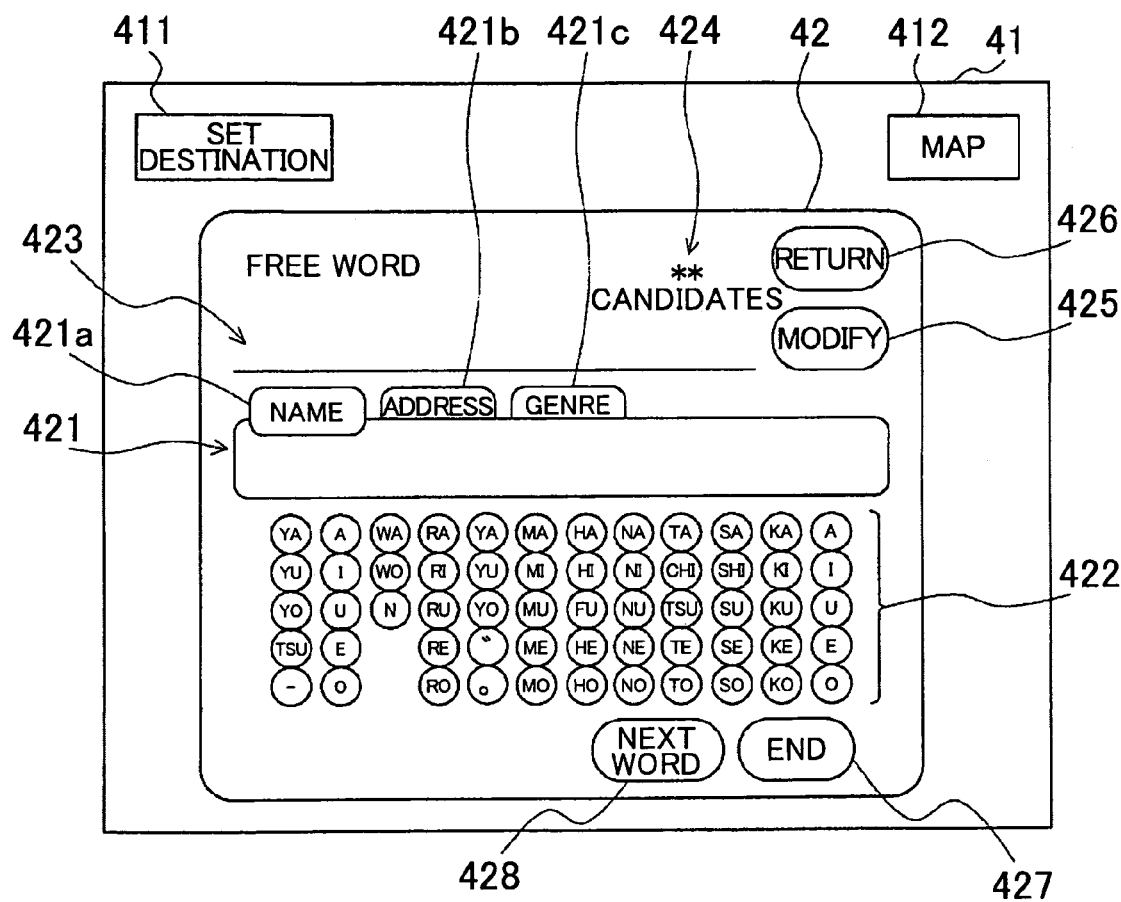
FIG. 3 is an explanatory figure that shows an input device and a display.

FIG. 3 shows the input device 41 and the display 42.

As shown in FIG. 3, various types of menu screens, such as a destination setting screen, a map screen of the area surrounding the current position, and the like, are displayed on the display 42. In addition, a touch panel is provided in the upper part of the display screen (the display 42) that allows the user to perform pointing by directly touching the touch panel with a finger. When the user touches a button or the like that is displayed in any of the screens on the display 42, information that corresponds to the touched button is detected by the touch panel, making it possible to input the information to the navigation device 1.

A fixed frame of the input device 41 is positioned around the outer edge of the display 42, and a Set Destination key 411 and a Map key 412 are provided in an upper area of the fixed frame. The Set Destination key 411 is configured from a push button (a hard key) that physically exists. The Map key 412 is used to display the map screen of the area surrounding the current position.

The Set Destination key 411 is a key for displaying a character string input screen for setting the destination, a route point, and the like (hereinafter called the destination).

The destination setting processing according to the present embodiment is performed by selecting the Set Destination key 411. Note that the destination that is set by the destination setting processing according to the present embodiment is used in the route searching and is also used in cases where the set destination and the candidate destinations in the vicinity of the current position are displayed on the map screen.

The display 42 in FIG. 3 is shown in a state in which the character string input screen is being displayed.

Keyword spaces 421, an input keyboard 422, a character input space 423, a number of candidates space 424, a Modify key 425, a Return key 426, an End key 427, and a Next Word key 428 are displayed on the character string input screen.

Keywords (including related keywords) that are selected in accordance with the character input are displayed in the keyword spaces 421. The keywords that are displayed in the keyword spaces 421 are displayed in the form of input keys, and any one of the displayed keywords can be selected by touching that keyword. Note that the keywords and the related keywords are displayed such that they can be differentiated.

Separate keyword spaces 421 exist for the name, the address, and the genre, and by selecting one of a name tab 421*a*, an address tab 421*b*, and a genre tab 421*c*, the user can display the keyword space 421 that corresponds to the selected tab, along with the highest-order keywords that are selected.

The input keyboard 422 is configured from individual keys for inputting the fifty sounds of the Japanese syllabary. Note that a ten-key numeric keypad and function keys may also be displayed.

The character input space 423 displays the characters that are input from the input keyboard 422, as well as the keywords that are selected from the keyword spaces 421. The characters that are input and the keywords are displayed such that they can be differentiated. The number of candidates space 424 displays the number of destination candidates (destination data records) that are selected according to the keywords and the input characters that are displayed in the character input space 423.

The Modify key 425 is a key that is used to modify the input characters and the keywords. The Return key 426 is a key for returning to a state prior to the last operation.

The End key 427 is a key for confirming the input characters and the keywords, as well as for separately displaying the destination candidates that are selected according to a selection of one of a character input and a keyword.

The Next Word key 428 is a key that is used in a case where input of search characters using the characters that are input in the character input space 423 is ended (thus designating the input characters as the search characters) and different search characters are then input.

Next, the divided display processing of the candidates in a case where the user selects the End key 427 after inputting a character string on the character string input screen in FIG. 3 will be explained.

In the explanation that follows, a case in which the user selects the End key 427 after inputting the character string "to-su-ni-" on the character string input screen will be used as an example.

FIG. 4A and FIG. 4B show examples of found destination candidates (destination data) that correspond to the input character string "to-su-ni-".

As shown in FIG. 4A, the information processing control device 20 selects from the destination data file 56, as the destination candidates that correspond to the input characters "to-su-ni-", the twenty-five destination candidates from "tosunii" to "tosunii rizooto in" and stores them in the RAM 24.

Note that in the present embodiment, the selecting of the destination candidates is done at the time that the End key 427 is selected, but the selecting may also be done sequentially every time a character is input.

That is, at the time that "to" is input, the destination candidates that include "to" may be selected from the destination data file 56 and stored in the RAM 24. Then at the time that "su" is also input, the destination candidates that include "to-su" may be selected from among the destination candidates that correspond to "to" and are stored in the RAM 24. The sequential selecting and storing are thereafter performed in the same manner every time an additional character is input.

In this case, the selection of the End key 427 signifies the start of candidate display processing of the destination candidates that are stored in the RAM 24, which have already been selected according to the characters that were input.

In order to implement the divided display of the destination candidates, the information processing control device 20 hierarchically arranges the selected destination candidates in order according to the rules described below.

Assume that destination candidates K1 to Kp, p in number, exist as a group of destination candidates that correspond to an n-th level.

In this case, the information processing control device 20 sets the first destination candidate K1, the last destination candidate Kp, and the median destination candidate Kq to be the destination candidates that are displayed at the first level.

The value of q is equal to p divided by 2 when p is an even number and equal to (p+1) divided by 2 when p is an odd number. Note that when p is an even number, q may also be calculated as p divided by 2, plus 1.

Thus the group of p destination candidates at the n-th level is divided into two subgroups at the median destination candidate Kq. Both the first and the second subgroups (K2 to Kq−1 and Kq+1 to Kp−1, excluding the destination candidates that are displayed at the n-th level) are set to be the destination candidates that are displayed at an (n+1)-th level. The number of the destination candidates in each of the subgroups that are set at the (n+1)-th level is then defined as p, and the first destination candidate K1, the last destination candidate Kp, and the median destination candidate Kq are set for each of the subgroups at the (n+1)-th level. Each subgroup is then further divided into two subgroups at the median destination candidate Kq.

In other words, p is redefined as the number of the destination candidates from the destination candidate K2 to the destination candidate Kq−1, which are not displayed at the first level. Then, in the same manner as at the first level, the three destination candidates to be displayed at the second level are set, and the subgroup is further divided into the two subgroups. At the same time, p is redefined as the number of the destination candidates from the destination candidate Kq+1 to the destination candidate Kp−1, which are not displayed at the first level, the three destination candidates to be displayed at the second level are set in the same manner, and the subgroup is further divided into the two subgroups.

The destination candidates to be displayed from the third level and the fourth level to the m-th level are set in the same manner, with each of the subgroups being divided into two subgroups and so on.

In a case where the numbers of the destination candidates in the subgroups, that is, the number of the destination candidates from the destination candidate K2 to the destination candidate Kq−1 and the number of the destination candidates from the destination candidate Kq+1 to the destination candidate Kp−1, are not greater than the number s of the destination candidates that can be displayed (s equals 5 in the present embodiment), the subgroups from the destination candidate K2 to the destination candidate Kq−1 and from the destination candidate Kq+1 to the destination candidate Kp−1 serve as the subgroups at the lowest level.

Each of the subgroups at the lowest level is displayed as a single list in a specified order (for example, in order according to the fifty sounds of the Japanese syllabary, in order according to the distance from the current position, or the like), instead of in the form of the divided display that displays the first destination candidate K1, the last destination candidate Kp, and the median destination candidate Kq.

Note that in the present embodiment, the fifty sounds of the Japanese syllabary are used as the specified display order, but in a case where the display order is the distance from the current position, the distances from the current position are one of displayed within individual destination candidate spaces, which are described later, and displayed in association with the individual destination candidate spaces. The user refers to the displayed distances and selects one of the first subgroup button and the second subgroup button (described later), depending on whether the distance to the destination is shorter or longer than the distance to the median destination candidate in the divided display.

FIG. 4B shows the twenty-five destination candidates in FIG. 4A in a state in which they are arranged hierarchically in accordance with the hierarchical arrangement rules described above.

As shown in FIG. 4B, the information processing control device 20 takes all twenty-five of the destination candidates and, at a first level, sets "tosunii" as the first destination candidate, "tosunii rizooto in" as the last destination candidate, and "tosunii sutoa okayama" as the median destination candidate, thus dividing the entire group of the destination candidates into two subgroups at the destination candidate "tosunii sutoa okayama".

Next, the information processing control device 20 takes the subgroup of the eleven destination candidates that come before the median destination candidate (on the side toward the first destination candidate) and divides it into two subgroups at the median destination candidate "tosunii heimen chuushajou". The median destination candidate, a first destination candidate "tosunii anbasadaa", and a last destination candidate "tosunii sutoa umeda" are set to be displayed at a second level.

In a case where the first subgroup button (described later) is pressed on a destination candidate display screen (described later) for the first level to select the subgroup of the destination candidates that come before the median destination candidate, the destination candidates that are set to be displayed at the second level are displayed.

The information processing control device 20 also takes the subgroup of the eleven destination candidates that come after the median destination candidate (on the side toward the last destination candidate) and divides it into two subgroups at the median destination candidate "tosunii sutoa fukuoka". The median destination candidate, a first destination candidate "tosunii sutoa koriyama", and a last destination candidate "tosunii rando hoteru" are set to be a second display at the second level.

In a case where the second subgroup button (described later) is pressed on the destination candidate display screen (described later) for the first level to select the subgroup of the destination candidates that come after the median destination candidate, the destination candidates that are set to be displayed at the second level are displayed.

The information processing control device 20 further divides the destination candidates at "tosunii heimen chuushajou" and "tosunii sutoa fukuoka", the two median destination candidates at the second level, creating subgroups at a third level. Because the number of the destination candidates in each of the subgroups is not greater than the number s of the destination candidates that can be displayed (s equals 5 in the present embodiment), the information processing control device 20 sets all of the destination candidates in each of the subgroups, that is, the destination candidates from "tosunii eigo kyoushitsu" to "tosunii shii eki", the destination candidates from "tosunii hotewru mirako" to "tosunii sutoa ikebukuro", and the like, to be displayed at the third level (the lowest level).

Once the hierarchical arrangement has been completed for all of the selected destination candidates, as described above, the information processing control device 20 displays the destination candidates that have been set for the first level on a destination candidate display screen 60.

Figure 5A:
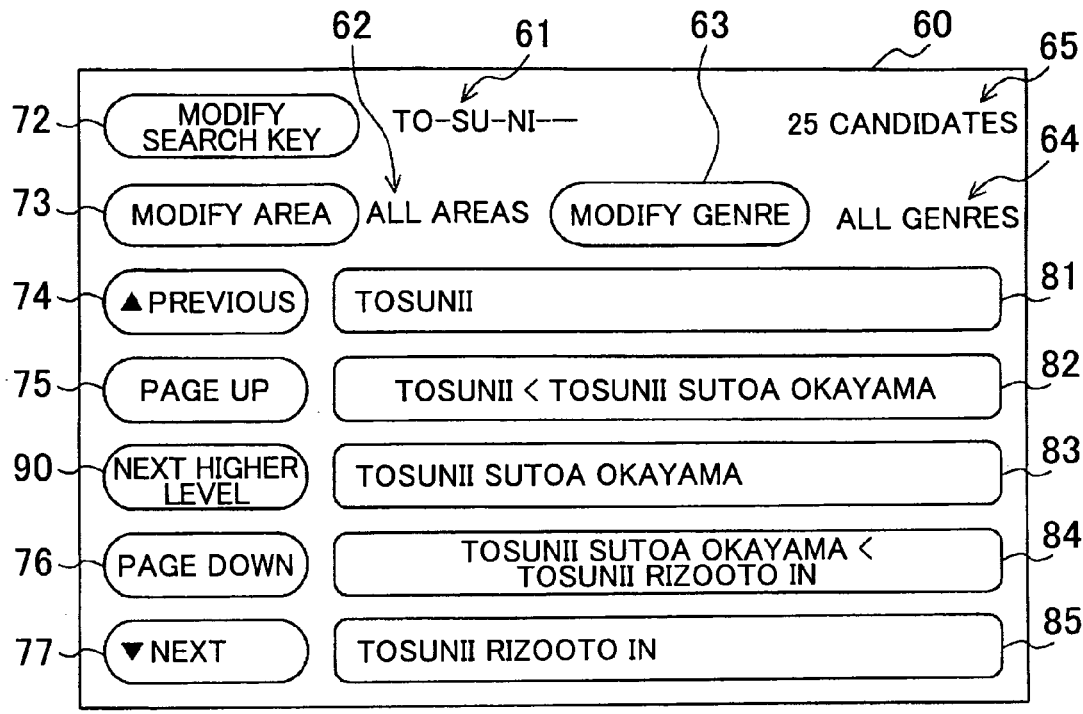
FIG. 5A and FIG. 5B are figures that show a destination candidate display screen with a divided display.
Figure 5B:
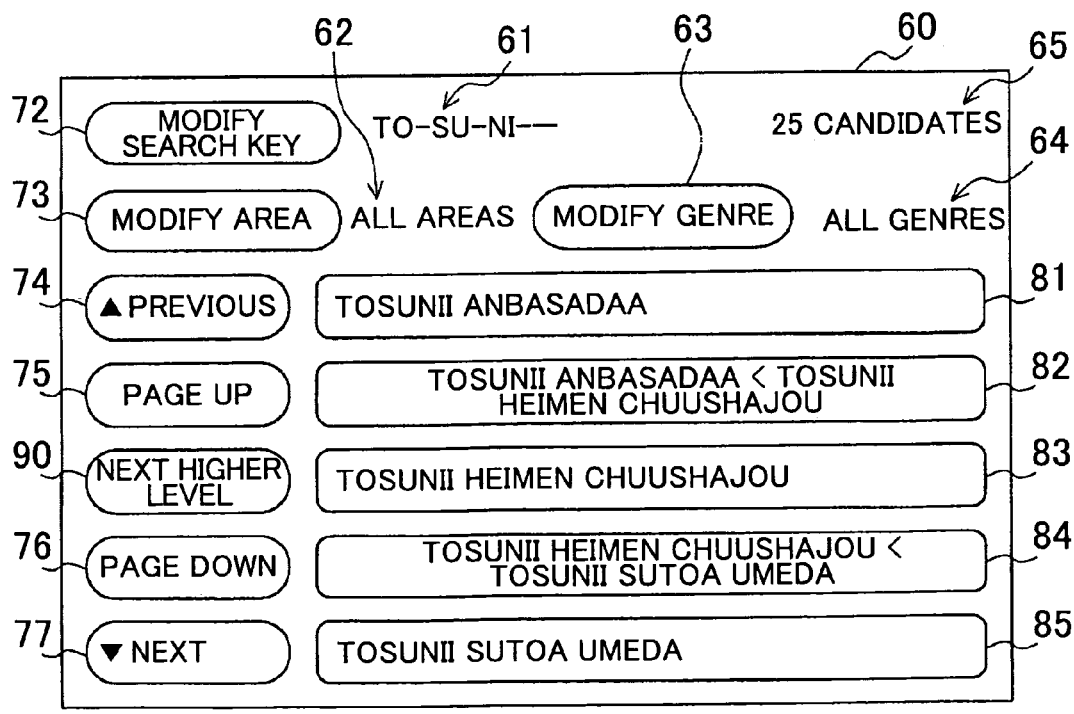

FIGS. 5A and 5B are figures that show the destination candidate display screen 60 with the divided display.

First, the various buttons and display spaces that are displayed on the destination candidate display screen 60 will be explained.

On the destination candidate display screen 60, an input character string display space 61 is a space that displays the input character string that was confirmed on the character string input screen (FIG. 3). In the example in FIGS. 5A and 5B, the input character string is "to-su-ni-".

An area input space 62 is a space for setting a search area when searching for (selecting) the location names that correspond to the input character string. The area may be, for example, "All areas", which is set by default, and may also be a specific prefecture or region to be searched, such as "Aichi Prefecture", "Tokyo Metropolitan", or the like.

The information processing control device 20 selects, from among all of the locations that are stored in the destination data file 56, the destination candidates that are located in the area that is selected in the area input space 62. However, in a case where "All areas" is selected, the selecting of the destination candidates according to the area is not performed.

A Modify Area button 73 is a button that is touched in order to change the search area that is set in the area input space 62. When the Modify Area button 73 is touched, various areas that can be selected are displayed, and the search area that is set in the area input space 62 can be changed by selecting one of the displayed areas.

A genre input space 64 is a space for setting the genre of the location names that correspond to the input character string, for which the search will be performed. The genre may be, for example, "All genres", which is set by default, and may also be "Restaurant", "Hotel", and the like.

The information processing control device 20 selects, from among all of the locations that are stored in the destination data file 56, the destination candidates that are included in the genre that is selected in the genre input space 64. However, in a case where "All genres" is selected, the selecting of the destination candidates according to the genre is not performed.

A Modify Genre button 63 is a button that is touched in order to change the search genre that is set in the genre input space 64. When the Modify Genre button 63 is touched, various genres that can be selected are displayed, and the search genre that is set in the genre input space 64 can be changed by selecting one of the displayed genres.

Using the area and the genre to select the destination candidates, as described above, makes it possible for the navigation device 1 to reduce the number of the destination candidates.

A number of candidates space 65 displays the number of the location names that have been found (selected) that correspond to the input character string (as well as the area and the genre). In the example in FIG. 5A, "25 candidates" is displayed, corresponding to the selection results that are shown in FIG. 4A.

The destination candidate spaces 81 to 85 are spaces that display the selected destination candidates and function as candidate display units.

At each level that is displayed on the destination candidate display screen 60, the first destination candidate is displayed in the destination candidate space 81, the median destination candidate is displayed in the destination candidate space 83, and the last destination candidate is displayed in the destination candidate space 85.

FIG. 5A shows the destination candidate display screen 60 displaying the first level of the twenty-five destination candidates (refer to FIG. 4A) that were selected as corresponding to the input character string "to-su-ni-i", so the destination candidates "tosunii", "tosunii sutoa okayama", and "tosunii rizooto in" are respectively displayed in the destination candidate spaces 81, 83, 85.

In a case where the lowest level is being displayed, the destination candidate spaces 82 and 84 that are respectively located between the destination candidate spaces 81 and 83 and the destination candidate spaces 83 and 85 display the destination candidates at the lowest level.

In a case where a level that is higher than the lowest level is being displayed, the destination candidate spaces 82 and 84 respectively function as the first subgroup button that selects the first of the two subgroups that are divided by the median destination candidate and as the second subgroup button that selects the second of the two subgroups. In the explanation that follows, in a case where the destination candidate spaces 82 and 84 respectively function as the first subgroup button and the second subgroup button, they are respectively called the first subgroup button 82 and the second subgroup button 84.

The first subgroup button 82 displays "tosunii<tosunii sutoa okayama" as a range display that indicates that the first subgroup, which is located between the first destination candidate "tosunii" and the median destination candidate "tosunii sutoa okayama", can be selected.

The second subgroup button 84 displays "tosunii<tosunii sutoa okayama<tosunii rizooto in" as a range display that indicates that the second subgroup, which is located between the median destination candidate "tosunii sutoa okayama" and the last destination candidate "tosunii rizooto in", can be selected.

Thus the first subgroup button 82 and the second subgroup button 84 function as lower level specification units, selection buttons, and range display units.

In a case where all of the selected destination candidates are arranged in a specified display order, the first subgroup button 82 and the second subgroup button 84, serving as the lower level specification units and the selection buttons, are placed in the specified order between the non-consecutive destination candidates that are set to be displayed in the divided display.

The range displays of both of the candidate subgroups are displayed such that they are indented by a specified number of spaces (two spaces in the display) in relation to the display positions of the destination candidates in the destination candidate spaces 81, 83, 85. That is, each of the range displays is displayed after a blank area that is equal to the specified number of spaces.

This makes it easier for the user to distinguish between the destination candidate displays and the range displays.

The destination candidate spaces 81 to 85 also function as candidate selection units for selecting the destination candidates that are displayed in the spaces. When one of the destination candidate spaces is touched, the destination candidate that is displayed in touched space is set as the destination.

Note that in a case where one of the destination candidate spaces is selected, a detail screen is displayed, and location information that corresponds to the selected destination candidate is read from the destination detail data file 58 and displayed. The destination candidate may also be set as the destination by selecting a Set button on the detail screen.

The first subgroup button 82 and the second subgroup button 84 are also buttons that change the display on the destination candidate display screen 60 to the level below the current level, based on the destination candidate subgroup that corresponds to the range display in the selected button.

A Next Higher Level button 90 is a button for changing to and displaying the next level above the current level in the divided display on the destination candidate display screen 60. Changing to and displaying the next lower level is accomplished by touching one of the first subgroup button 82 and the second subgroup button 84.

In a case where the divided display is displaying the first level, which is the highest level, the Next Higher Level button 90 may be displayed in an inactive state, such that the user can tell that it cannot be selected.

A Previous button 74 and a Next button 77 are buttons that, in a case where the current display is the divided display, respectively change the display to the divided display for the previous destination candidate subgroup and the divided display for the next destination candidate subgroup at the same level as the currently displayed level. (In this case, "previous" means "on the side toward the beginning of the display order", and "next" means "on the side toward the end of the display order", the display order being the fifty sounds of the Japanese syllabary or the like.)

In a case where the current display is a single list of the destination candidates, the Previous button 74 and the Next button 77 are buttons that scroll the destination candidates that are displayed in the destination candidate spaces 81 to 85 up and down, respectively, one at a time.

A Page Up button 75 and a Page Down button 76 are buttons that, in a case where the current display is a list display, scroll the destination candidates that are displayed in the destination candidate spaces 81 to 85 up and down, respectively, one page at a time (one page being the number s of the destination candidates that can be displayed, which equals 5 in the present embodiment).

In a case where the current display is the divided display, the Page Up button 75 and the Page Down button 76 also function as switching units that switch to the list display. Switching from the list display to the divided display is accomplished by double-clicking (touching twice in succession within a specified time interval) one of the Page Up button 75 and the Page Down button 76. However, a dedicated display switching button that performs switching back and forth between the divided display and the list display may also be provided.

Next, the screen changes that follow FIG. 5A on the destination candidate display screen 60 that is configured as described above will be explained.

If one of the destination candidate spaces 81, 83, 85 is touched on the destination candidate display screen 60 in FIG. 5A, the information processing control device 20 sets the destination candidate that is displayed in the touched space as the destination. Thereafter, the information processing control device 20 displays on the display 42 a map that has the set destination at its center and searches for a route from the current position to the destination.

If the destination candidates that are displayed in the destination candidate spaces 81, 83, 85 do not include the desired destination, and the user touches the first subgroup button 82, the information processing control device 20 changes the destination candidate display screen 60 to the second level (one level below the current level) and, as shown in FIG. 5B, shows a divided display of the destination candidate subgroup that comes before the median destination candidate "tosunii sutoa okayama".

In other words, the information processing control device 20 shows a divided display at the second level, which is set to be the destination candidate subgroup that is located between the destination candidates "tosunii" and "tosunii sutoa okayama" that were displayed in the first subgroup button 82 that was touched. The first destination candidate "tosunii anbasadaa", the last destination candidate "tosunii sutoa umeda", and the median destination candidate "tosunii heimen chuushajou" are respectively displayed in the destination candidate spaces 81, 85, 83.

To allow the third level to be selected, the information processing control device 20 displays "tosunii anbasadaa<tosunii heimen chuushajou" as the range display in the first subgroup button 82 and displays "tosunii heimen chuushajou<tosunii sutoa umeda" as the range display in the second subgroup button 84.

On the destination candidate display screen 60 for the second level that is shown in FIG. 5B, if the Next Higher Level button 90 is selected, the information processing control device 20 returns to the divided display at the first level (refer to FIG. 5A), which is one level higher.

On the other hand, if the Next button 77 is selected, the information processing control device 20 shows the divided display for the next destination candidate subgroup at the second level, which is the same as the current level. The first destination candidate "tosunii sutoa koriyama", the last destination candidate "tosunii rando hoteru", and the median destination candidate "tosunii sutoa fukuoka" are respectively displayed in the destination candidate spaces 81, 85, 83.

If the Page Down button 76 is selected, the information processing control device 20 switches from the divided display to the list display and displays in list form the five destination candidates from the destination candidate "tosunii sutoa okayama", which follows the last destination candidate "tosunii sutoa umeda" (refer to FIG. 4), to "tosunii sutoa nagoya".

Figure 6C:
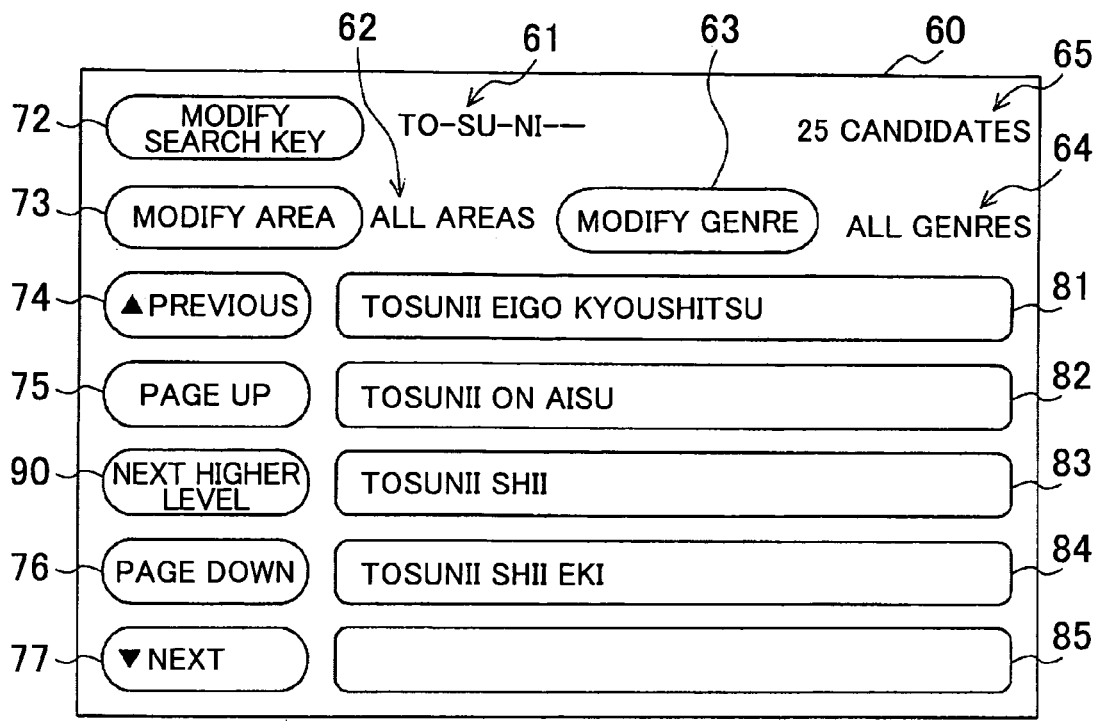
FIG. 6C and FIG. 6D are figures of destination candidate display screens that display, in list form, groups of destination candidates at a lowest level.

On the destination candidate display screen 60 in FIG. 5B, if the first subgroup button 82 is selected, the information processing control device 20 changes the destination candidate display screen 60 to the third level, as shown in FIG. 6C, and shows a list display of the destination candidate subgroup at the third level that comes before the median destination candidate "tosunii heimen chuushajou".

The information processing control device 20 switches the screen display from the divided display to the list display because the third level is the lowest level, displaying in the destination candidate spaces 81 to 84 the destination candidates "tosunii eigo kyoushitsu", "tosunii on aisu", "tosunii shii", and "tosunii shii eki", which are the destination candidates at the third level that are set to correspond to the touched first subgroup button 82.

As shown in FIG. 6C, the number of the destination candidates that are set for the current destination candidate subgroup is four (refer to FIG. 4B), so the destination candidate space 85 becomes a blank space.

Figure 6D:
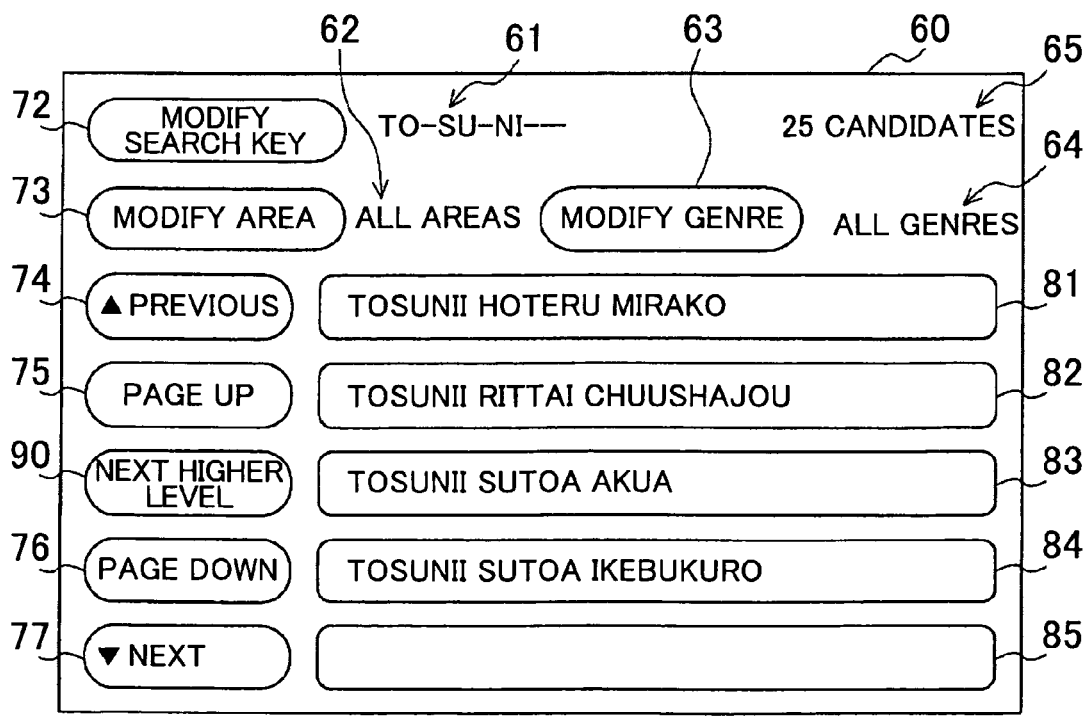

On the other hand, if the second subgroup button 84 is selected on the destination candidate display screen 60 in FIG. 5B, the information processing control device 20 changes the destination candidate display screen 60 to the display shown in FIG. 6D, and shows a list display of the destination candidate subgroup at the third level that comes after the median destination candidate "tosunii heimen chuushajou". The information processing control device 20 switches the screen display from the divided display to the list display because the third level is the lowest level, displaying the four set destination candidates "tosunii hoteru mirako", "tosunii rittai chuushajou", "tosunii sutoa akua", and "tosunii sutoa ikebukuro" in the destination candidate spaces 81 to 84.

Figure 7E:
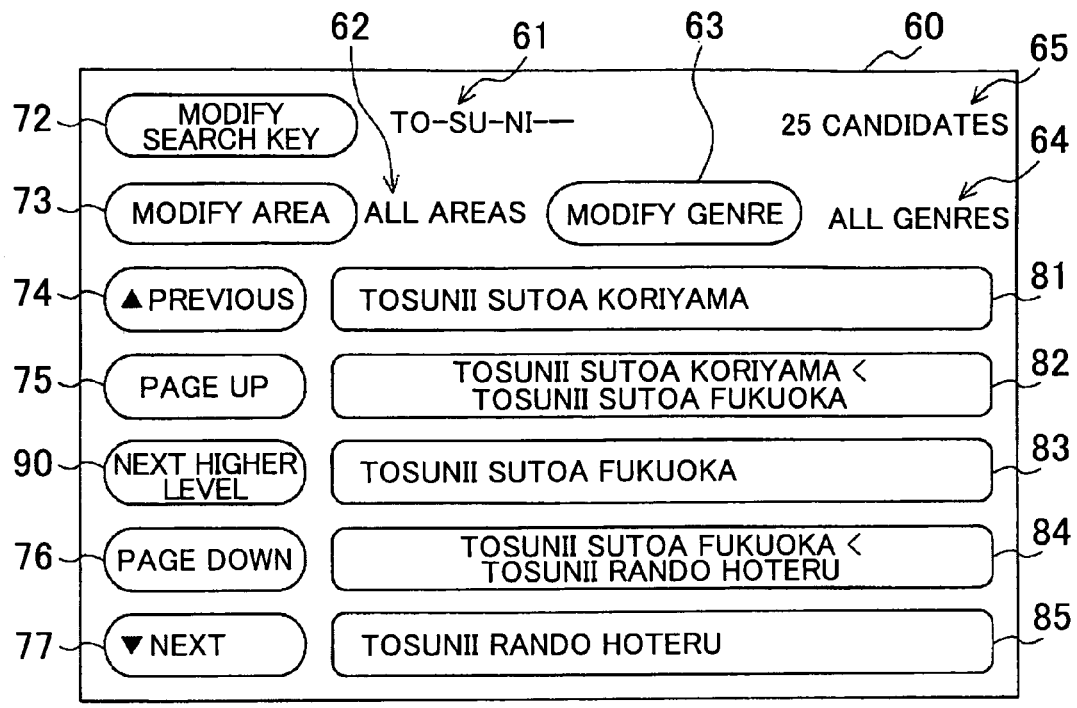
FIG. 7E and FIG. 7F are figures that show other examples of the destination candidate display screens.

FIG. 7E is a figure that shows the destination candidate display screen 60 with the divided display of the second subgroup at the second level.

The information processing control device 20 displays the destination candidate display screen 60 in FIG. 7E in a case where the second subgroup button 84 is selected on the destination candidate display screen 60 at the first level that is shown in FIG. 5A.

The information processing control device 20 also displays the destination candidate display screen 60 in FIG. 7E in a case where the Next button 77 is selected on the destination candidate display screen 60 that is shown in FIG. 5B, that is, the destination candidate display screen 60 that shows the divided display of the first destination candidate subgroup at the same level (the second level) as the destination candidate subgroups that are shown in the divided display in FIG. 5A.

In the same manner, in a case where one more destination candidate subgroup exists at the same level (the second level) and following the destination candidate subgroups that are shown in the divided display in FIG. 5A, if the Previous button 74 is selected on the destination candidate display screen 60, the information processing control device 20 displays the destination candidate display screen 60 in FIG. 7E, although this additional destination candidate subgroup does not exist among the destination candidates that are shown in FIGS. 4A and 4B and that are the subject of this explanation.

Figure 7F:
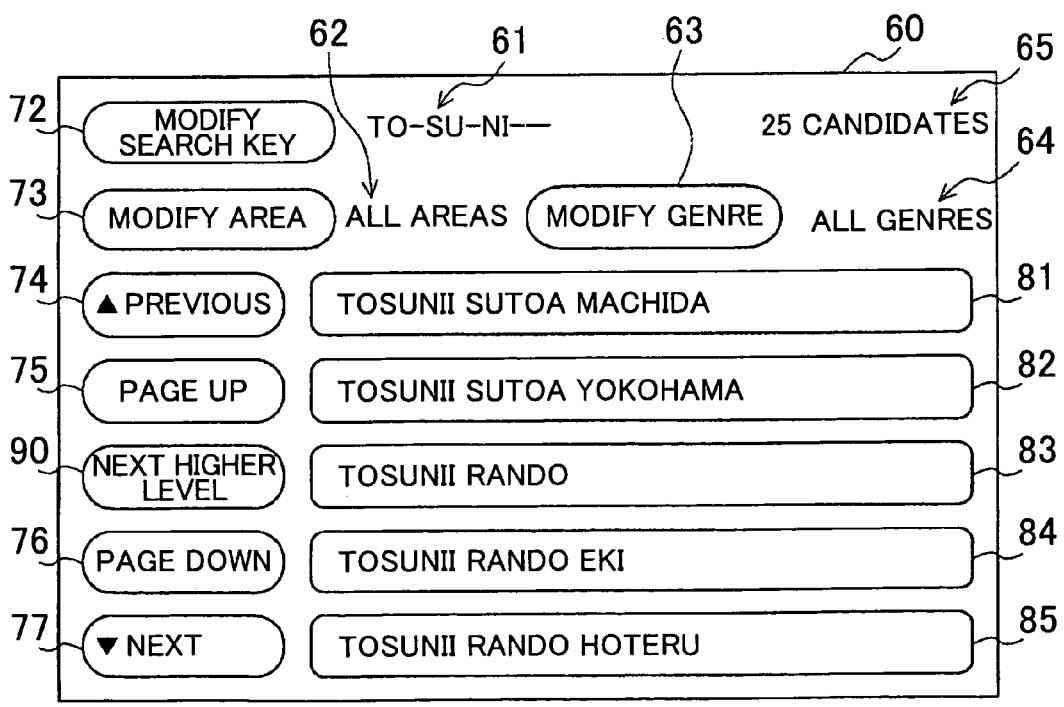

If the second subgroup button 84 is selected on the destination candidate display screen 60 for the second level that is shown in FIG. 7E, the information processing control device 20 changes the display to the destination candidate display screen 60 in FIG. 7F.

Because the third level, which is the next level down, is the lowest level, the information processing control device 20 switches from the divided display to the list display, as described above, displaying in the destination candidate spaces 81 to 85 the destination candidates in the destination candidate subgroup that corresponds to the selected second subgroup button 84.

Note that, as described above, on each of the destination candidate display screens 60 in FIGS. 6C and 6D, the number of the destination candidates that are set for each of the destination candidate subgroups is four (refer to FIG. 4B), so the fifth destination candidate space 85 becomes a blank space.

In contrast, in a case where the number of the destination candidates in each of the subgroups at the lowest level is less than the number s of the destination candidates that can be displayed (s equals 5 in the present embodiment), the list display may also be displayed such that it includes the destination candidate "tosunii rando hoteru", which follows the destination candidate subgroup from "tosunii sutoa machida" to "tosunii rando eki", as shown in FIG. 7F. The list display may also be done such that it starts with the destination candidate "tosunii sutoa fukuoka" that precedes the destination candidate subgroup.

With regard to the question of whether a blank space is displayed as in FIG. 6C or one of the preceding destination candidate and the following destination candidate is displayed as in FIG. 7F, one of the two methods may be adopted, and it is also acceptable to set one method as the default while giving the user the choice of changing to the other method.

An embodiment of the present invention has been explained above, but the present invention is not limited by this example, and other embodiments and modifications can also be used within the scope of the claims.

For example, in the embodiment explained above, a case was explained in which the number s of the destination candidate spaces that can be displayed on the destination candidate display screen 60 is five. Then, the hierarchical arrangement shown in FIG. 4B is created, such that, of the number s of the displayable destination candidate spaces, two spaces are taken by the first subgroup button 82 and the second subgroup button 84, and three of the destination candidates are set to be displayed in the remaining (s−2) spaces (three spaces in the present embodiment).

In contrast to this, the number s of the displayable destination candidate spaces may also be set to a different number in accordance with the screen size of the destination candidate display screen 60.

FIGS. 8A and 8B show hierarchical arrangements of the twenty-five destination candidates in FIG. 4A in a case where the number s of the destination candidate spaces is seven.

Figure 9A:
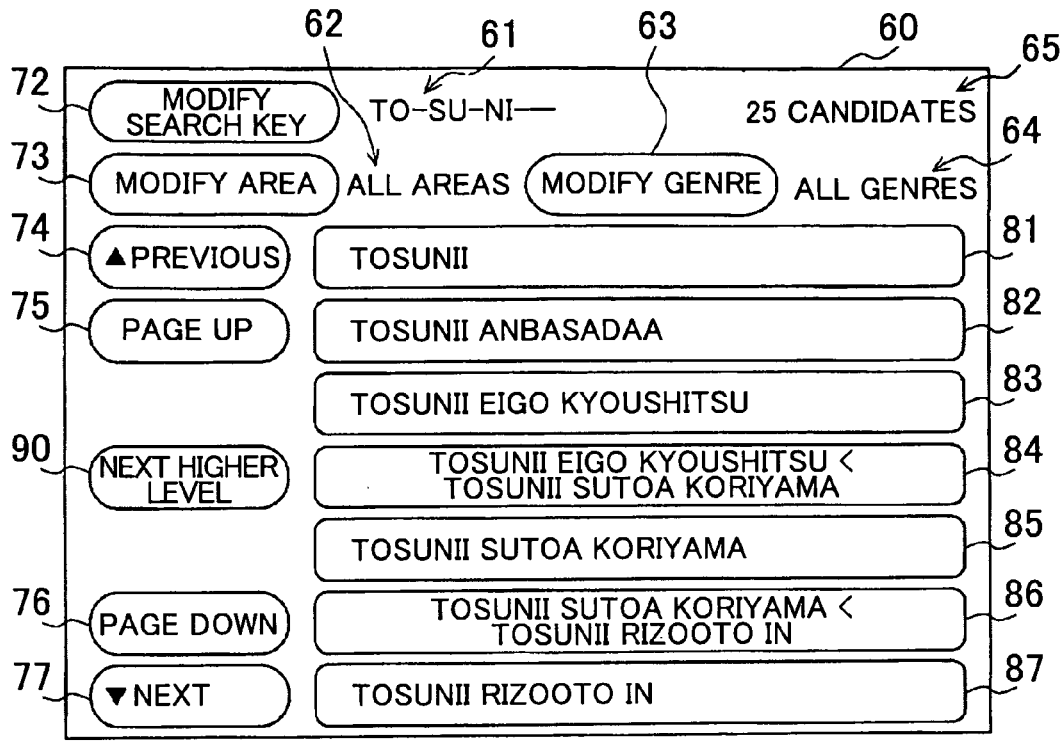
FIG. 9A and FIG. 9B are figures of destination candidate display screens with divided displays at a first level that correspond to the hierarchical arrangements in FIGS. 8A and 8B.
Figure 9B:
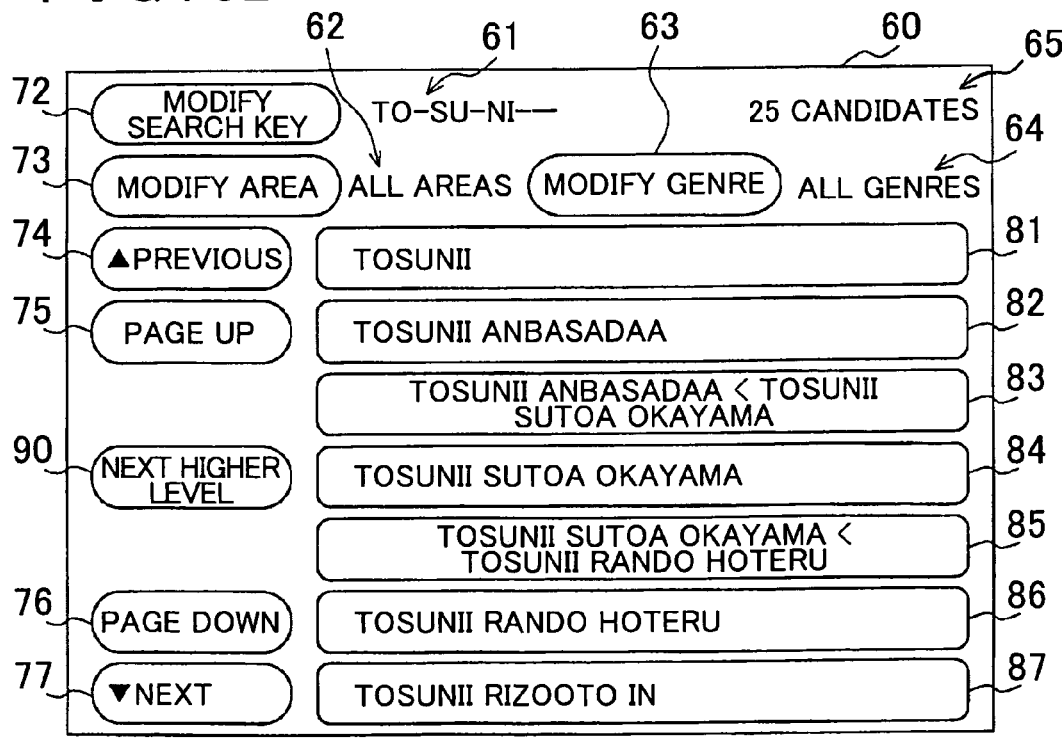

FIGS. 9A and 9B show the destination candidate display screens 60 with divided displays at the first level that respectively correspond to FIGS. 8A and 8B.

First, a first modified example that is shown in FIGS. 8A and 9A will be explained.

In the case of the first modified example, assuming that the number of the destination candidates in a destination candidate group is p and the number of the destination candidate spaces is s, the information processing control device 20 sets, as the destination candidates to be displayed in the divided display, the destination candidates K1 to K3, which are the first three destination candidates in the destination candidate group (the first (s−4) destination candidates), as well as the last destination candidate Kp.

The information processing control device 20 also sets, as a destination candidate to be displayed, the median destination candidate Kr between the destination candidates K4 and Kp−1. In this case, r equals q plus 1, with q being the value that was explained above for the embodiment.

Thus, in the case of the twenty-five destination candidates that are shown in FIG. 4A, five of the destination candidates, that is, the first three destination candidates "tosunii", "tosunii anbadasaa", and "tosunii eigo kyoushitsu", the median destination candidate "tosunii sutoa koriyama", and the last destination candidate "tosunii rizooto in", are set as the destination candidates for the divided display at the first level, as shown in FIG. 8A.

Furthermore, for the first destination candidate subgroup at the first level, located between "tosunii eigo kyoushitsu" and "tosunii sutoa koriyama", five of the destination candidates, that is, the first three destination candidates "tosunii on aisu", "tosunii shii", and "tosunii shii eki", the median destination candidate "tosunii rittai chuushajou", and the last destination candidate "tosunii sutoa okayama", are set as the destination candidates for the divided display at the second level.

Additionally, for the first destination candidate subgroup at the second level, located between "tosunii shii eki" and "tosunii rittai chuushajou", the destination candidates "tosunii heimen chuushajou" and "tosunii hoteru mirako" are set as the destination candidates for the list display at the third level.

Each of the destination candidate subgroups and subgroups at the second and third levels are set in the same manner, as shown in FIG. 8A.

Next, as shown in FIG. 9A, the destination candidates that are set at the first level are displayed in the destination candidate spaces 81 to 83, 85, and 87.

In addition, between the non-consecutive destination candidates (between the destination candidates "tosunii eigo kyoushitsu" and "tosunii sutoa koriyama" and between the destination candidates "tosunii sutoa koriyama" and "tosunii rizooto in"), the destination candidate space 84 and the destination candidate space 86 respectively function as the first subgroup button 84 and the second subgroup button 86 and show the respective range displays.

Thus, according to the first modified example, displaying the first (s−4) destination candidates (s being the number of the displayable destination candidates) in order starting at the destination candidate space 81 makes it possible for a single list to be formed by incorporating a function that shows the ordinary list display that displays the destination candidates consecutively.

In this case, the four displayed items other than the first (s−4) destination candidates are the first subgroup button, the second subgroup button, the median destination candidate, and the last destination candidate.

Note that because five destination candidates are displayed in the divided display, including in a second modified example that is described below, the number of the levels can be reduced, making it possible to reduce the number of operations that are required to reach the lowest level.

Next, the second modified example, which is shown in FIGS. 8B and 9B will be explained.

In the first and second modified examples, two more destination candidate spaces are provided than in the embodiment explained above, increasing the number of the displayable destination candidates by two. In the first modified example, the two additional destination candidates are the destination candidates K2 and K3 that follow the first destination candidate K1.

In contrast, in the second modified example, the two additional destination candidates are the destination candidate K2 that follows the first destination candidate K1 and the destination candidate Kp−1 that precedes the last destination candidate Kp.

In the case of the second modified example, the information processing control device 20 sets the median destination candidate Kq in the same manner as in the embodiment.

That is, in a case where p is the number of the destination candidates, the destination candidate Kq is set such that q is equal to p divided by 2, or q is equal to p divided by 2 plus 1 when p is an even number and equal to (p+1) divided by 2 when p is an odd number.

The information processing control device 20 also sets the first and second destination candidates K1, K2 and the last and second-to-last destination candidates Kp, Kp−1 to be shown in the divided display for the destination candidate group.

Thus, in the case of the twenty-five destination candidates that are shown in FIG. 4A, five of the destination candidates, that is, the first two destination candidates "tosunii" and "tosunii anbadasaa", the median destination candidate "tosunii sutoa okayama", and the last two destination candidates "tosunii rando hoteru" and "tosunii rizooto in", are set as the destination candidates for the divided display at the first level, as shown in FIG. 8B.

Furthermore, for the first destination candidate subgroup at the first level, located between "tosunii anbadasaa" and "tosunii sutoa okayama", five of the destination candidates, that is, the first two destination candidates "tosunii eigo kyoushitsu" and "tosunii on aisu", the median destination candidate "tosunii hoteru mirako", and the last two destination candidates "tosunii sutoa ikebukuro" and "tosunii sutoa umeda", are set as the destination candidates for the divided display at the second level.

Additionally, for the first destination candidate subgroup at the second level, located between "tosunii on aisu" and "tosunii hoteru mirako", the destination candidates "tosunii shii", "tosunii shii eki", and "tosunii heimen chuushajou" are set as the destination candidates for the list display at the third level.

Each of the destination candidate subgroups at the second and third levels are set in the same manner, as shown in FIG. 8B.

Next, as shown in FIG. 9B, the destination candidates that are set at the first level are displayed in the destination candidate spaces 81, 82, 84, 86, 87.

In addition, between the non-consecutive destination candidates (between the destination candidates "tosunii anbadasaa" and "tosunii sutoa okayama" and between the destination candidates "tosunii sutoa okayama" and "tosunii rando hoteru"), the destination candidate space 83 and the destination candidate space 85 respectively function as the first subgroup button 83 and the second subgroup button 85 and show the respective range displays.

Next, modified examples that pertain to the range displays in the first subgroup button 82 and the second subgroup button 84 that function as the lower level specification units and the selection buttons will be explained with reference to FIGS. 10 and 11.

Figure 10A:
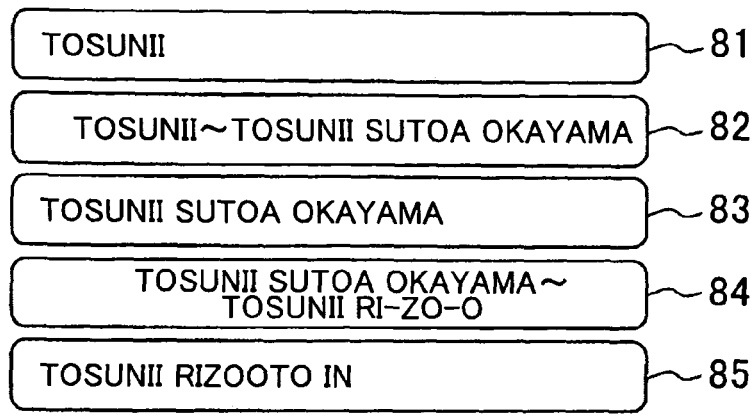
FIG. 10A, FIG. 10B and FIG. 10C are figures of modified examples that pertain to a range display.

In the embodiment that is explained above, the symbol "<" is used to indicate the ranges of the destination candidates that are shown in the first subgroup button 82 and the second subgroup button 84. In contrast, the symbol "~" is used in the modified examples, as shown in FIG. 10A. The user reads the symbol as "to", so the display is easier to read.

In other words, with respect to the first destination candidate K1, the median destination candidate Kq, and the last destination candidate Kp, the first subgroup button 82 displays "K1~Kq", and the second subgroup button 84 displays "Kq~Kp". Thus, as shown in FIG. 10A, the first subgroup button 82 displays "tosunii~tosunii sutoa okayama", and the second subgroup button 84 displays "tosunii sutoa okayama~tosunii rizoo".

The example in FIG. 10A is used to explain a case in which the range displays in the first and second subgroup buttons 82, 84 display "[the first displayed destination candidate~the second displayed destination candidate]" indented by two spaces, that is, a case in which "K1~Kq" and "Kq~Kp" are both indented by two spaces.

That is why, as shown in the second subgroup button 84 in FIG. 10A, the destination candidate "tosunii rizooto in" is displayed only as far as "tosunii rizoo".

Accordingly, in order to prevent the destination candidate name that is displayed after the "~" from being truncated, the "~" that indicates the range is displayed at the midpoint of the number of characters that can be displayed in the first and second subgroup buttons 82, 84 (the number of characters that can be displayed following the indent of two spaces). A specified number of characters (eight characters in the example in FIG. 10B) is therefore always displayed after the "~".

However, in a case where the number of characters in the destination candidate name before the "~" is less than the specified number of characters, as well as in a case where the number of characters in the first destination candidate name is less than the specified number of characters and the number of characters in the second destination candidate name is greater than the specified number of characters, the "~" character is shifted leftward to come immediately after the first destination candidate name, making it possible to display a larger number of characters.

Note that a horizontal double arrow pointing left and right (a horizontal version of the arrow in FIG. 11D, described later) may also be used instead of the "~".

Figure 10B:
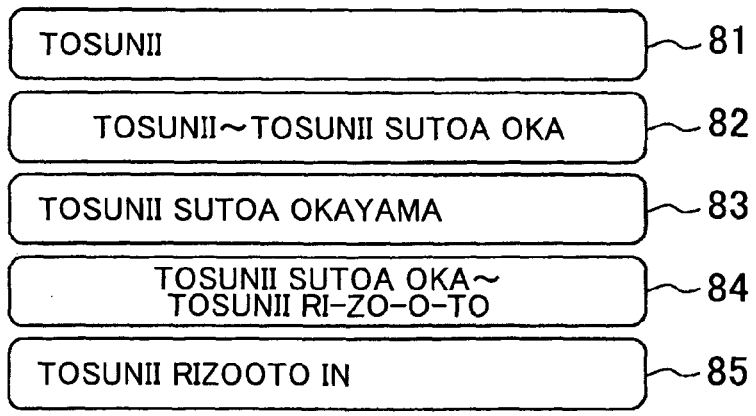

Note that for the modified examples in FIGS. 10A and 10B, cases have been explained in which the range displays in the first and second subgroup buttons 82, 84 display the first destination candidate K1, the median destination candidate Kq, and the last destination candidate Kp before and after the "~".

In contrast to this, the destination candidates that actually displayed when the first and second subgroup buttons 82, 84 are selected may also be displayed before and after the "~".

In other words, the first subgroup button 82 may display "K2~Kq-1", and the second subgroup button 84 may display "Kq+1~Kp-1".

In that case, if the number of the displayable characters is ten, the display in the first subgroup button 82 becomes "tosunii anbadasaa~tosunii sutoa umeda", and the display in the second subgroup button 84 becomes "tosunii sutoa koriyama~tosunii rando hoteru" (in a case where the display format is that of the example in FIG. 10A).

Displaying in this manner the destination candidates that can be displayed and selected when the first and second subgroup buttons 82, 84 are selected makes it possible to display the same number of destination candidates as the number s of the destination candidate spaces.

Figure 10C:
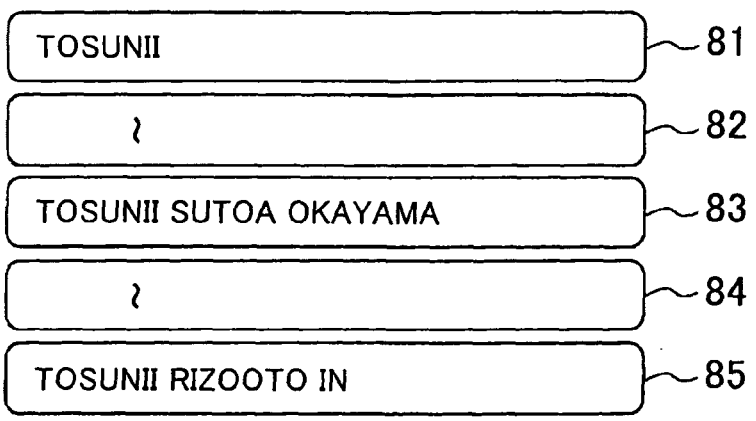

FIGS. 10C and 10D are examples of cases in which a symbol that indicates a range is displayed as the range display.

Figure 11D:
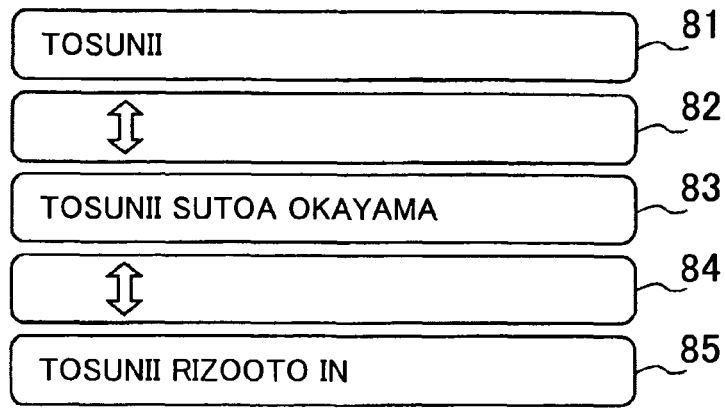
FIG. 11D, FIG. 11E and FIG. 11F are figures of other modified examples that pertain to the range display.

In FIG. 10C, the symbol is a vertically oriented "~", and FIG. 11D, the symbol is a vertical double arrow.

Displaying only the symbols in this manner, instead of displaying the destination candidates, makes it easier to distinguish the first and second subgroup buttons 82, 84 for selecting the ranges from the buttons for selecting the destination candidates (the destination candidate spaces 81, 83, 85).

Figure 11E:
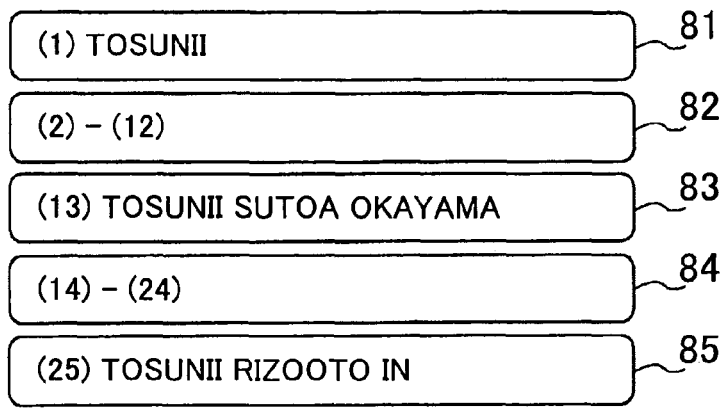

FIG. 11E shows a modified example in which destination candidate numbers and the destination candidates are displayed in the destination candidate spaces 81, 83, 85, while the destination candidate numbers and symbols are displayed as the range displays in the first and second subgroup buttons 82, 84.

The example in FIG. 11E is an example in which the destination candidates that indicate the ranges are displayed in the form of the destination candidate numbers for the destination candidates that are actually displayed when the first and second subgroup buttons 82, 84 are selected, as was explained above for the modifications to the modified examples that were explained using FIGS. 10A and 10B. The "~" is also used as the symbol that indicates the ranges.

In this case, the destination candidate numbers are the numbers that are used in the arranging of all of the destination candidates that are selected according to the input character string in the specified display order (the fifty sounds of the Japanese syllabary or the like), as shown in FIG. 4A.

Note that a destination candidate number may be assigned to each of the destination candidates that are displayed on the destination candidate display screen 60, and the destination candidate numbers may also be displayed for the destination candidates that are displayed before and after the first and second subgroup buttons 82, 84 and the range selection buttons.

For example, the first destination candidate may be displayed as "(1) K1", the median destination candidate may be displayed as "(2) Kq", and the last destination candidate may be displayed as "(3) Kp", while the first subgroup button 82 may display "(1)~(2)" and the second subgroup button 84 may display "(2)~(3)".

In these cases, including the example that is shown in FIG. 11E, the display in each of the first and second subgroup buttons 82, 84 may also display the destination candidate numbers indented by at least one space.

The symbols that are used in FIGS. 10C and 11D and the associated modified examples may also be used instead of the symbol "~" in this case.

In the embodiment that is explained above and in each of the modified examples, cases were explained in which the destination candidate spaces are used as the lower level specification units (the first subgroup button 82 and the second subgroup button 84). Specifically, cases were explained in which the destination candidate spaces 82, 84 in the embodiment, the destination candidate spaces 84, 86 in the example in FIG. 9A, and the destination candidate spaces 83, 85 in the example in FIG. 9B respectively function as the first subgroup button and the second subgroup button.

Figure 11F:
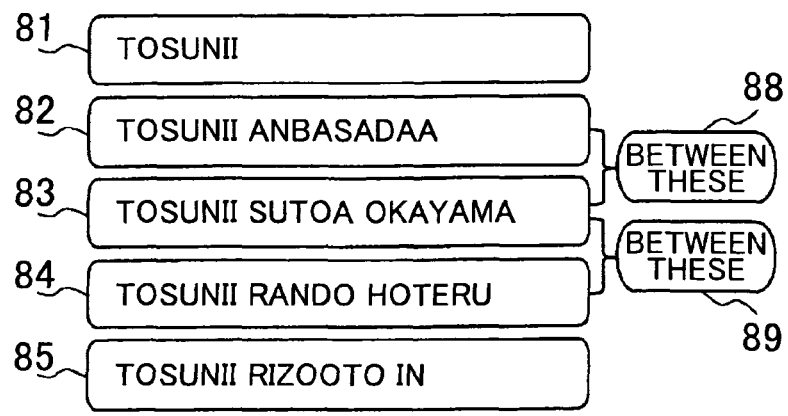

In contrast to these examples, a configuration may be used in which a first subgroup button 88 and a second subgroup button 89 that are separate from the destination candidate spaces 81 to 85 serve as the lower level specification units, as shown in FIG. 11F.

This makes it possible to display the same number of destination candidates as the number s of the destination candidate spaces.

In this case, the number of the destination candidates that are displayed is increased by the number of the lower level specification units that have been made separate (the number being two in the example in FIG. 11F). Therefore, the hierarchical arranging to create the two subgroups at each level is done according to one of the methods in FIGS. 8A and 8B, which are examples of cases where five destination candidates are set to be displayed. Note that FIG. 11F shows a display that corresponds to a case in which the hierarchical arranging is done by the method in FIG. 8B.

In the embodiment that is explained above, a case was explained in which two subgroups are created at each level, but it is also acceptable to create a number t of subgroups (t being at least three).

In this case, where the number of the destination candidate spaces that can be displayed on the destination candidate display screen 60 is set to s and the number of the subgroups is set to t, the information processing control device 20 sets the destination candidates to be displayed, as well as range designation buttons (which are equivalent to the first subgroup button 82 and the second subgroup button 84), by the method described below.

Specifically, in a case where the number of the subgroups is t, it is necessary to have a number t of the range designation buttons H1 to Ht (which correspond to the first subgroup button 82 and the second subgroup button 84), so the number of the destination candidates to be displayed is set to (s−t). Then the first to the (s−t−2)-th median destination candidates Kq1 to Kq(s−t−2) are displayed.

Then at least one destination candidate that precedes (is located toward the beginning of the display order from) the first range designation button H1 and at least one destination candidate that follows the last range designation button Ht are displayed. In addition, at least one destination candidate is displayed between each pair of the range designation buttons H1 to Ht.

Furthermore, in the embodiment that is explained above, a case was explained in which the characters that are used for searching are input efficiently by displaying the keywords that include the input characters, but not using the keywords is also possible.

In the embodiment that is explained above, a case was explained in which all of the destination candidates that are stored in the RAM 24 when the End key 427 is touched on the character string input screen (FIG. 3) are hierarchically arranged from the first level to the lowest level, as shown in FIG. 4B.

However, the information processing control device 20 may also set the destination candidates to be displayed at the first level in response to the touching of the End key 427, but then set the destination candidates to be displayed at the second and lower levels every time one of the first subgroup button 82 and the second subgroup button 84 is selected, setting the destination candidates in the destination candidate subgroups that correspond to the selected button.

Additionally, in the embodiment that is explained above, the navigation device (the search device) was explained on the assumption that it is used in Japan. Specifically, a navigation device with Japanese specifications was explained, in which the input device 41 that inputs the characters is configured from keys representing the fifty sounds that are the input units for the Japanese language, and the data that is stored in the destination data file 56, the guidance point data file 57, the destination detail data file 58, and the like pertains to destination searches within Japan.

However, the environment within which the navigation device can be used is not limited to Japan. The search function that utilizes the divided display as described above can be adapted for use in any country by adapting the specifications for the input device 41 and the various types of data to the region in question.

One example of a navigation device (a destination input device) for use outside Japan may be a device that is provided with keys for the English alphabet, making it suitable for English (English character) input.

The device may also be made suitable for input in any language, such as German, Spanish, French, Arabic, Chinese, Korean, Russian, and the like. In the case of a navigation device that is suitable for Chinese-language input, for example, the input device 41 is provided with an input keyboard 422 that is suitable for Chinese pinyin input.

The language that is used for input does not necessarily have to be the language of the country (region) where the navigation device is used. For example, a navigation device that uses German-language input may also be used in France. In that case, the data in the destination data file 56 and the destination detail data file 58 that are used for searching when the destination search is performed, that is, the data that is compared to the input characters (for example, the destination names, the keywords, the addresses, and the like), is stored in a form that is suited to the input language.

Note that in addition to the data that is suited to the input language, data that is suited to the language of the country (region) where the navigation device is used may also be stored among the data that is used for searching.

Note also that the data that is not used for searching when the destination search is performed, such as the additional information data, for example, does not have to be stored in a form that is suited to the input language. The data that is not used for searching may be stored in a form that is suited to the input language, and it may also be stored in a form that is suited to the language of the country (region) where the navigation device is used. It may also be stored in a form that is suited to both the input language and the language of the country (region) where the navigation device is used.

The embodiment that is explained above and each of the modified examples can achieve the effects listed below.

(a) Displaying the destination candidates that are selected according to the input character string in the divided display makes it possible to display all of the selected destination candidates in a fixed number of operations, making it possible to lighten the operating load on the user, no matter where the user's desired destination (facility) is positioned among the selected destination candidates.

Even in a case where the desired destination is positioned in the second half of the selected destination candidates, in particular, selecting the second subgroup button 84 makes it possible to select the destination candidate subgroup that includes the desired destination in a small number of operations.

For example, in a case where the destination candidates at each level are divided into two subgroups, even if the desired destination is positioned at the sixth level, which is the lowest level, the lowest level can be displayed in five operations, so the desired destination candidate can be selected by a sixth operation.

In other words, in a case where the lowest level is a u-th level, the maximum number of operations that are necessary to select the desired destination candidate is u, and in a case where the desired destination is positioned at a level that is higher than the lowest level, the number of operations that are necessary to select the desired destination candidate is the same as the level number.

Furthermore, in a case where the number of the destination candidate spaces is five, for example, two-hundred-fifty-three destination candidates can be displayed in six levels of the divided displays, so any one of all two-hundred-fifty-three destination candidates can be selected in six operations or less.

Note that in order to display the two-hundred-fifty-three destination candidates sequentially in list form in the five destination candidate spaces, a maximum of fifty operations are required, even if the Page Down button 76 is used. In the present embodiment, by comparison, all of the destination candidates can be displayed in a maximum of six operations, so the number of selection operations can be dramatically reduced.

Moreover, in a case where the destination candidates at each level are divided into at least three subgroups, the number of operations can be reduced even further.

(b) On the destination candidate display screen 60 at the first level, the beginning (first) and ending (last) selected destination candidates are respectively displayed in the destination candidate spaces 81, 85, so the user can know whether the desired destination (facility) has been selected by the current search conditions without scrolling through all of the pages.

What is claimed is:
1. A search device, comprising:
   an input unit that inputs characters;
   a selection unit that selects candidates that correspond to the characters that are input by the input unit;
   a current level acquisition unit that acquires from the selected candidates, as a current level candidate group, a candidate group in which the candidates are consecutive in a specified display order;
   a lower level specification unit that specifies as lower level candidate groups, from the acquired current level candidate group, a plurality of sub-candidate groups of the candidates;
   a candidate display unit that displays in a specified display order corresponding to the candidates:
      a candidate that is not in the sub-candidate groups of the specified lower level candidate groups; and
      names of specified lower candidate groups, but does not display the individual candidates within the sub-candidate groups of the specified lower level candidate groups;
   a candidate selection unit that selects the displayed candidate;
   an output unit that outputs the selected candidate as a search result; and a lower level selection unit configured to receive a user selection of one of the lower level candidate groups, wherein the lower level specification unit specifies, as the lower level candidate groups, from the acquired current level candidate group,
(1) a candidate group including all of the candidates of the current level candidate group consecutively from a first candidate of the current level candidate group to a median candidate of the current level candidate group not including the first candidate and the median candidate and
(2) a candidate group including all of the candidates of the current level candidate group consecutively from the median candidate to a last candidate of the current level candidate group not including the median candidate and the last candidate, when the lower level selection unit receives a selection of one of the lower level candidate groups, the current level acquisition unit acquires, as the current level candidate group, all of the sub-candidate group of the user selected lower level candidate group, and the candidate display unit displays at least three candidates: the first candidate, the last candidate, and the median candidate in the acquired current level candidate group.

2. The search device according to claim 1, further comprising:
a range display unit that displays a range of the candidates that consist of the specified lower level candidate groups.

3. The search device according to claim 2, wherein
the lower level specification unit consists of a plurality of selection buttons that correspond to the lower level candidate groups, and
the range display unit displays a range of the candidates on each of the selection buttons.

4. The search device according to claim 1, wherein
the candidate display unit, when the number of the candidates in the current level candidate group that was acquired by the current level acquisition unit is not greater than the number of the candidates that can be displayed, displays all of the candidates in the acquired current level candidate group.

5. The search device according to claim 1, further comprising:
a display switching unit that switches to a list display, wherein the candidate display unit, when it is instructed to switch to the list display, displays the selected candidates in a list form in the specified display order.

6. A non-transitory computer-readable storage medium storing a computer-executable search program for a computer, the program comprising:
instructions for inputting characters;
instructions for selecting candidates that correspond to the characters that are input by the input unit;
instructions for acquiring from the selected candidates, as a current level candidate group, a candidate group in which the candidates are consecutive in a specified display order;
instructions for specifying as lower level candidate groups, from the acquired current level candidate group, a plurality of sub-candidate groups of the candidates;
instructions for displaying in a specified display order corresponding to the candidates:
a candidate that is not in the sub-candidate groups of the specified lower level candidate groups; and
names of specified lower candidate groups, but does not display the individual candidates within the sub-candidate groups of the specified lower level candidate groups;
instructions for displaying the displayed candidate;
instructions for outputting the selected candidate as a search result; and
instructions for receiving a user selection of one of the lower level candidate groups;
instructions for, when a user selection of one of the lower level candidate groups is received, acquires, as the current level candidate group, all of the sub-candidate group of the user selected lower level candidate group, wherein
(1) a candidate group including all of the candidates of the current level candidate group consecutively from a first candidate of the current level candidate group to a median candidate of the current level candidate group not including the first candidate and the median candidate and (2) a candidate group including all of the candidates of the current level candidate group consecutively from the median candidate to a last candidate of the current level candidate group not including the median candidate and the last candidate are specified as the lower level candidate groups from the acquired current level candidate group, and
at least three candidates: the first candidate, the last candidate, and the median candidate in the acquired current level candidate group are displayed.

* * * * *